(12) United States Patent
Yang

(10) Patent No.: US 11,385,514 B2
(45) Date of Patent: Jul. 12, 2022

(54) ARRAY SUBSTRATE AND DISPLAY PANEL

(71) Applicants: Chongqing HKC Optoelectronics Technology Co., Ltd., Chongqing (CN); HKC CORPORATION LIMITED, Shenzhen (CN)

(72) Inventor: Chunhui Yang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 651 days.

(21) Appl. No.: 16/327,309

(22) PCT Filed: Nov. 14, 2018

(86) PCT No.: PCT/CN2018/115320
§ 371 (c)(1),
(2) Date: Feb. 21, 2019

(87) PCT Pub. No.: WO2020/062478
PCT Pub. Date: Apr. 2, 2020

(65) Prior Publication Data
US 2021/0373376 A1 Dec. 2, 2021

(30) Foreign Application Priority Data
Sep. 30, 2018 (CN) .......................... 201821620225.7

(51) Int. Cl.
*G02F 1/1362* (2006.01)
*G02F 1/1337* (2006.01)

(52) U.S. Cl.
CPC .... *G02F 1/13629* (2021.01); *G02F 1/133788* (2013.01)

(58) Field of Classification Search
None
See application file for complete search history.

(56) References Cited

U.S. PATENT DOCUMENTS 11,112,668 B2 * 9/2021 Yang ................. G02F 1/136295

FOREIGN PATENT DOCUMENTS

| CN | 102800296 | 11/2012 |
| CN | 106200163 | 12/2016 |
| CN | 107167987 | 9/2017 |
| JP | H10340960 A | * 12/1998 |
| KR | 100623975 B1 | 9/2006 |

OTHER PUBLICATIONS

Wenlong Zhou, the ISA written comments, Jun. 2019, CN.

* cited by examiner

*Primary Examiner* — Ashok Patel

(57) ABSTRACT

The present application discloses an array substrate and a display panel. The array substrate includes a display region and a peripheral region; a plurality of pixels formed in the display region; a plurality of alignment circuit formed in the peripheral region for implementing alignment for the liquid crystals within the pixels; where the alignment circuits include first bonding pads and a plurality of short-circuited bars, each of the plurality of short-circuited bars is electrically connected to the first bonding pads through transfer lines, and any two of the transfer lines adjacently disposed are disposed on different metal layers.

18 Claims, 3 Drawing Sheets

ARRAY SUBSTRATE AND DISPLAY PANEL

The present application claims priority to the Chinese Patent Application No. CN201821620225.7, filed with National Intellectual Property Administration, PRC on Sep. 30, 2018, and entitled "ARRAY SUBSTRATE AND DISPLAY PANEL", which is incorporated herein by reference in its entirety.

TECHNICAL FIELD

The present application relates to the technical field of displaying, and particularly to an array substrate and a display panel.

BACKGROUND

The description herein merely provides background information related to the present application, but does not necessarily constitute the prior art.

For a liquid crystal display, which consists of two main parts: a liquid crystal panel and a backlight unit, the liquid crystal display operates based on the following principle: liquid crystal molecules are placed between two parallel glass substrates and a driving voltage is applied on the two glass substrates to control the rotational directions of the liquid crystal molecules, such that a light is refracted out of the backlight unit to generate an image.

The alignment process for liquid crystal is subordinate to the liquid crystal cell process. The alignment technologies for liquid crystal are physical or chemical methods to enable an alignment film to have liquid crystal molecules aligned at a pretilt angle in the same direction, that is to say, enable the alignment film to anisotropically align the liquid crystal molecules. Depending on different displaying modes of the liquid crystals or different molecule structures of chosen polyimide (PI) liquid, there are two common types of the alignment technologies for liquid crystal molecules, that is, rubbing and light alignment technologies.

The alignment circuit disposed on an array substrate is apt to result in short circuiting, which is disadvantage for operation of light alignment. In view of this, there exists an ongoing need in the industry for a solution to solve such problem.

SUMMARY

It is an object of the present application to provide an array substrate and a display panel which is advantage for light alignment.

The array substrate according to the present application includes:

a display region and a peripheral region;

a plurality of pixels, formed in the display region; and a plurality of alignment circuits, formed in the peripheral region, for implementing alignment of liquid crystals within the pixels;

where the alignment circuits include first bonding pads and a plurality of short-circuited bars, each of the plurality of short-circuited bars is electrically connected to the first bonding pads through transfer lines, and any two of the transfer lines adjacently disposed are disposed on different metal layers.

Optionally, the short-circuited bars include first short-circuit bars and second short-circuited bars, the first short-circuited bars are electrically connected to the first bonding pads through a plurality of first transfer lines and the second short-circuited bars are electrically connected to the first bonding pads through a plurality of second transfer lines, and the first transfer lines and the second transfer lines are disposed on different metal layers.

Optionally, the metal layers include a first layer and a second layer. The array substrate includes data lines. The data lines include a plurality of odd-numbered data lines and a plurality of even-numbered lines, and the odd-numbered data lines and the even-numbered data lines are disposed in a spaced-apart manner. The first transfer lines are coupled with the odd-numbered data lines and the second transfer lines are coupled with the even-numbered data lines, and the first transfer lines and the second transfer lines are disposed in a spaced-apart manner.

Optionally, the first transfer lines and the first short-circuited bars are disposed on the first metal layer and the same manufacturing procedure is established together with the first metal layer; the second transfer lines and the second short-circuited bars are disposed on the second metal layer and the same manufacturing procedure is established together with the second metal layer.

Optionally, the first transfer lines and the first short-circuited bars are disposed on the second metal layer and the same manufacturing procedure is established together with the second metal layer; the second transfer lines and the second short-circuited bars are disposed on the first metal layer and the same manufacturing procedure is established together with the first metal layer.

Optionally, the first transfer lines are disposed on the first metal layer and the same manufacturing procedure is established together with the first metal layer; and the first short-circuited bars, the second short-circuited bars and the second transfer lines are disposed on the second metal layer and the same manufacturing procedure is established together with the second metal layer.

Optionally, the first transfer lines are disposed on the second metal layer and the same manufacturing procedure is established together with the second metal layer; and the first short-circuited bars, the second short-circuited bars and the second transfer lines are disposed on the first metal layer and the same manufacturing procedure is established together with the first metal layer.

Optionally, the first short-circuited bars include first sides and second sides disposed in parallel to each other. The first short-circuited bars have provided with the via holes for connecting the first transfer lines and the via holes are equidistant from the first sides and the second sides.

Optionally, the first short-circuited bars and the second short-circuited bars are disposed in parallel to each other and the first transfer lines and the second transfer lines are disposed in parallel to each other, and the first transfer lines and the second transfer lines are wired to the first bonding pads in a straight line manner.

It is another object of the present application to provide a display panel.

A display panel includes the array substrate as described above and an opposite substrate disposed on the opposite side of the array substrate. A liquid crystal layer is sandwiched between the array substrate and the opposite substrate.

By arranging two adjacent transfer lines on different metal layers and covering each of the metal layers with a protection layer, the influence of etching residue can be significantly prevented, such that the problem that the transfer lines in form of etching residue along the border of the short-circuited bars cause short-circuiting can be effectively solved and the signals for light alignment can normally apply voltage on the array substrate and/or the opposite substrate disposed on the opposite side of the array substrate through preset lines on the array substrate, and it is guaranteed that the array substrate can better implement the light alignment action and the influence of potential short-circuiting on the array substrate can be effectively avoided. In addition, even in the case that via holes are formed along the short-circuited bars, although in the positions that correspond to the border of the short-circuited bars, unevenness is caused by the occurrence of etching residue at the border of the short-circuited bars, two adjacent transfer lines are located on different metal layers at the border of the short-circuited bars and each of the metal layers is covered with the protection layer, such that it is nearly impossible that short-circuiting is caused by the etching residue between adjacent transfer lines, and thus the alignment circuit can better implement light alignment action to cause the liquid crystals to produce an incident angle to guarantee better display effect for the display panel.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may further derive other accompanying drawings from these accompanying drawings without creative efforts. In the accompanying drawings.

DETAILED DESCRIPTION

Figure 1:
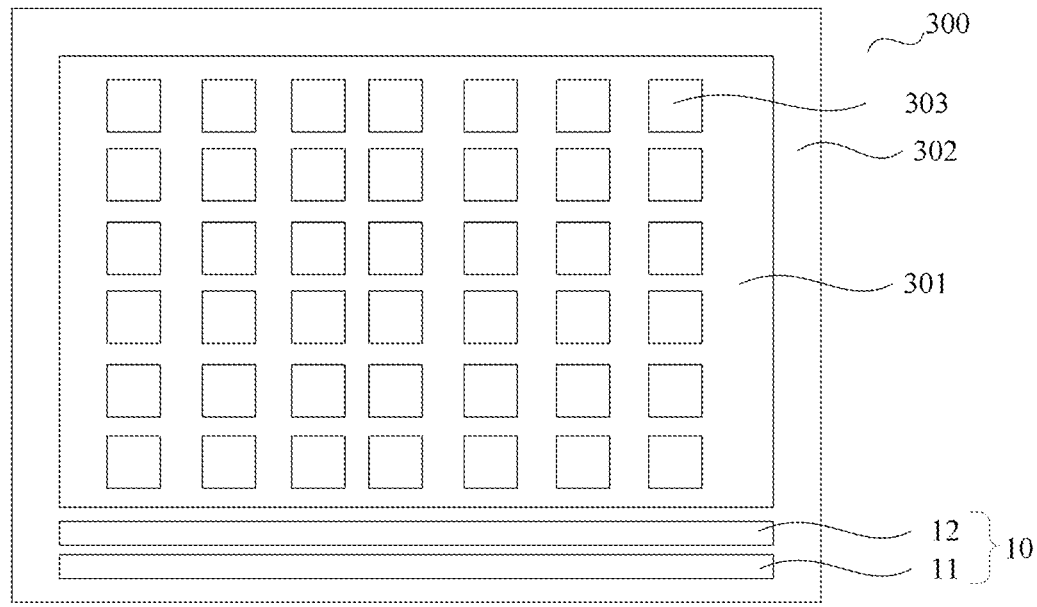
FIG. 1 is a schematic illustration of an array substrate according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation, and thus should not be construed as limitations on the present application. In addition, the terms "first", "second" are merely for a descriptive purpose, and cannot to be understood to indicate or imply a relative importance, or implicitly indicate the number of the indicated technical features. Hence, the features defined by "first", "second" can explicitly or implicitly include one or more of the features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood for those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, units and/or components, but do not preclude the presence or addition of one or more other features, integers, steps, operations, units, components and/or combinations thereof.

In the drawings, same numerals or characters are configured to represent elements that are similar in structure throughout the various views.

The array substrate and display panel according to the present application will be described in further detail below with reference to the embodiments shown in FIGS. 1 to 8.

Figure 2:
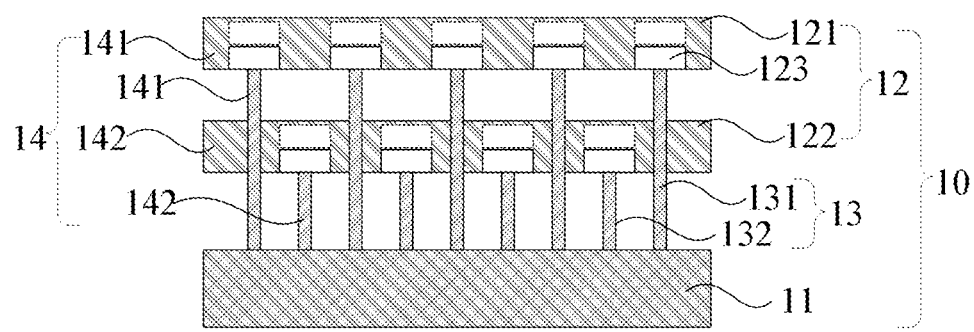
FIG. 2 is a schematic illustration of an alignment circuit according to an embodiment of the present application.

As shown in FIGS. 1 and 2, the inventor designs an undisclosed wiring configuration for the alignment circuit 10, in which the first metal layer is used for all of the short-circuited bars 12 and the second metal layer is used for all of the transfer lines 13. Because the spacing between the first bonding pads 11 is limited and fixed, the spacing between the transfer lines 13 is limited as well. Such wiring configuration is apt to cause short-circuiting of even-numbered data lines and odd-numbered data lines by wiring of etching residue of the second metal layer along the short-circuited bars 12, which is disadvantage for operation of light alignment.

As shown in FIGS. 1 to 7, the present application discloses an array substrate, the array substrate 300 includes:

a display region 301 and a peripheral region 302; a plurality of pixels 303, formed in the display region 301; a plurality of alignment circuit 10, formed in the peripheral region 302, for implementing alignment of liquid crystals within the pixels 303;

where the alignment circuits 10 includes first bonding pads 11 and a plurality of short-circuited bars 12, each of the plurality of short-circuited bars 12 is electrically connected to the first bonding pads 11 through a transfer line 13, and any two of the transfer lines 13 adjacently disposed are disposed on different metal layers.

By arranging two adjacent transfer lines 13 on different metal layers 14 and covering each of the metal layers 14 with a protection layer, the influence of the etching residue can be significantly prevented, such that the problem that the transfer lines 13 in form of etching residue along the border of the short-circuited bars 12 cause short-circuiting can be effectively solved and signals for light alignment can normally apply voltage on the array substrate and/or the opposite substrate 200 disposed on the opposite side of the array substrate through preset lines on the array substrate, and it is guaranteed that the array substrate can better implement the light alignment action and the influence of potential short circuiting on the array substrate can be effectively avoided. Furthermore, even in the case that via holes 123 are formed along the short-circuited bars 12, in the positions that correspond to the border of the short-circuited bars 12, there is unevenness resulting from the occurrence of etching residue at the border of the short-circuited bars 12. Two adjacent transfer lines 13 reside on different metal layers 14 at the border of the short-circuited bars and each of the metal layers 14 is covered with the protection layer, such that it is nearly impossible that short circuiting is caused by the etching residue between adjacent transfer lines 13, and thus the alignment circuit 10 can better implement light alignment action to cause the liquid crystals to produce an incident angle to guarantee better display effect for the display panel.

As shown in FIGS. 3 to 7, the short-circuited bar include a first short-circuited bar 121 and a second short-circuited bar 122, and the first short-circuited bar 121 is electrically connected to the first bonding pads 11 through a plurality of first transfer lines 131 and the second short-circuited bar 122 is electrically connected to the first bonding pads 11 through a plurality of second transfer lines 132, and the first transfer line 131 and the second transfer line 132 are disposed on different metal layers 14. Comparing with the undisclosed wiring configuration of the alignment circuit 10 by the inventor, the first transfer line 131 and the second transfer line 132, in this embodiment, are disposed on different metal layers 14. Using different metal layers 14 for wiring of the first transfer line 131 and the second transfer line 132 enables short circuiting of data line resulting from the etching residue to be effectively avoided and guarantees that the array substrate can better implement light alignment action and the influence of the potential short circuiting on the array substrate is effectively prevented.

The metal layer 14 includes a first metal layer 141 and a second metal layer 142, and the array substrate includes data lines. The data lines include a plurality of odd-numbered data lines and a plurality of even-numbered data lines, and the odd-numbered data lines and the even-numbered data lines are spaced apart from each other. The first transfer lines 131 are coupled with the odd-numbered data lines and the second transfer lines 132 are coupled with the even-numbered data lines, and the first transfer lines 131 and the second transfer lines 132 are spaced apart from each other. By connecting the first transfer lines 131 and the second transfer lines 132 in such manner that odd-numbered data lines and even-numbered data lines are power fed by respective transfer lines, the first transfer lines 131 and the second transfer lines 132 are enabled to be uniformly disposed and spaced apart on different metal layers, short circuiting resulting from etching residue between the adjacent transfer lines is further prevented, such that the alignment circuit 10 can better implement light alignment action to cause the liquid crystals to produce an incident angle to guarantee better display effect for the display panel.

Figure 3:
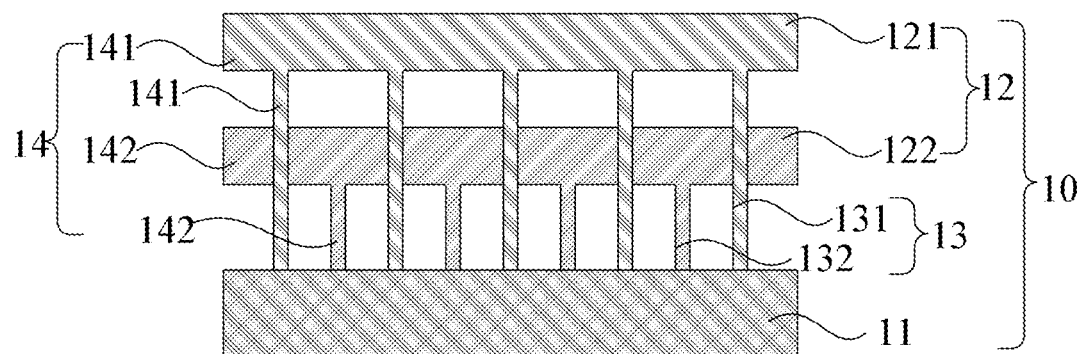
FIG. 3 is a schematic illustration of an alignment circuit according to a further embodiment of the present application.

As shown in FIG. 3, the first transfer lines 131 and the first short-circuited bars 121 are disposed on the first metal layer 141 and the same manufacturing procedure is established together with the first metal layer 141; the second transfer lines 132 and the second short-circuited bar 122 are disposed on the second metal layer 142 and the same manufacturing procedure is established together with the second metal layer 142. By using the first metal layer 141 for wiring of the first transfer lines 131 and the first short-circuited bars 121, the first transfer lines 131 and the first short-circuited bars 121 are simple and easy to be manufactured and the arranging efficiency of the transfer lines and the short-circuited bars 12 is significantly improved and thus the production efficiency of the array substrate is improved; the contact defects resulting from connecting the first transfer lines 131 and the first short-circuited bars 121 through the via holes 123 are significantly avoided, thereby guaranteeing that the array substrate can better implement light alignment action; by wiring the second transfer lines 132 and the second short-circuited bars 122 together through the second metal layer 142, the second transfer lines 132 and the second short-circuited bars 122 are simple and easy to be manufactured. Different metal wiring are used for the first transfer lines 131 and the second transfer lines 132 respectively, thus occurrence of etching residue is effectively prevented, and short circuiting resulting from a form of etching residue of transfer lines adjacently disposed along the short-circuited bars 12 is significantly prevented, such that a signal for light alignment can normally apply voltage on the array substrate and/or the opposite substrate disposed on the opposite side of the array substrate through preset lines on the array substrate, thereby facilitating light alignment action and effectively avoiding the influence of potential short circuiting on the array substrate.

Figure 4:
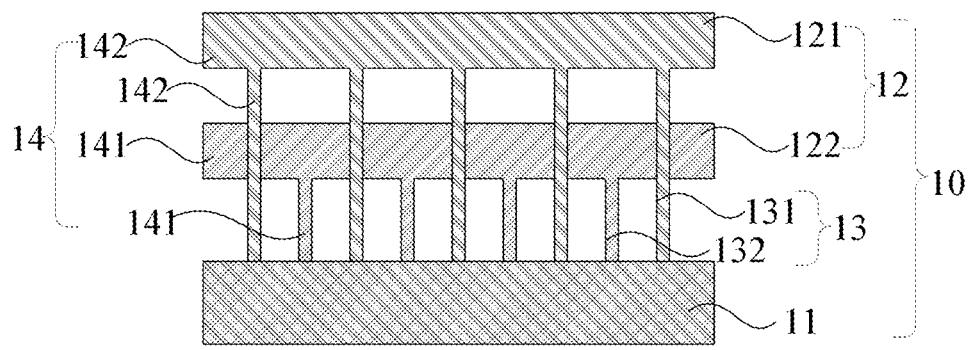
FIG. 4 is a schematic illustration of an alignment circuit according to a further embodiment of the present application.

As shown in FIG. 4, the first transfer lines 131 and the first short-circuited bars 121 are disposed on the second metal layer 142 and the same manufacturing procedure is established together with the second metal layer 142; the second transfer lines 132 and the second short-circuited bar 122 are disposed on the first metal layer 141 and the same manufacturing procedure is established together with the first metal layer 141. By using the first metal layer 141 for wiring of the second transfer lines 132 and the second short-circuited bars 122, the second transfer lines 132 and the second short-circuited bars 122 are simple and easy to be manufactured and the arranging efficiency of the transfer lines and the short-circuited bars 122 is significantly improved and thus the production efficiency of the array substrate is improved; the contact defects resulting from connecting the second transfer lines 132 and the second short-circuited bars 122 through the via holes 123 are significantly avoided, thereby guaranteeing that the array substrate can better implement light alignment action; by using the second metal layer 142 for wiring of the first transfer lines 131 and the first short-circuited bars, the first transfer lines 131 and the first short-circuited bars 121 are simple and easy to be manufactured. Different metal wiring is used for the first transfer lines 131 and the second transfer lines 132, thus the occurrence of etching residue is effectively prevented, and short circuiting resulting from a form of etching residue of transfer lines adjacently disposed along the short-circuited bars 12 is significantly prevented, such that a signal for light alignment can normally apply voltage on the array substrate and/or the opposite substrate disposed on the opposite side of the array substrate through preset lines on the array substrate, thereby facilitating light alignment action and effectively avoiding the influence of potential short circuiting on the array substrate.

Figure 5:
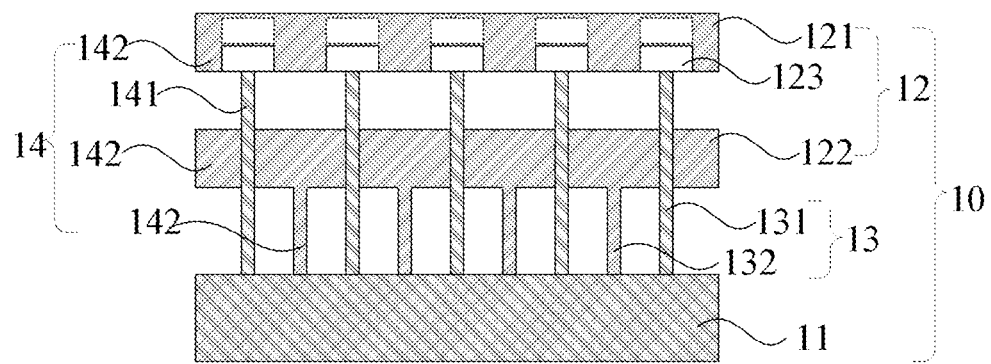
FIG. 5 is a schematic illustration of an alignment circuit according to a further embodiment of the present application.

As shown in FIG. 5, the first transfer lines 131 are disposed on the first metal layer 141 and the same manufacturing procedure is established together with the first metal layer 141; the first short-circuited bars 121, the second short-circuited bars 122 and the second transfer lines 132 are disposed on the second metal layer 142 and the same manufacturing procedure is established together with the second metal layer 142. The first metal layer 141 is used for wiring of the first short-circuited bars 121 and the second short-circuited bars 122, the second metal layer 142 is used for wiring of the first transfer lines 131, the first metal layer 141 is used for wiring of the second transfer lines 132. Different metal wiring are used for the first transfer lines 131 and the second transfer lines 132 respectively, which facilitates preventing occurrence of etching residue, and thus short circuiting resulting from a form of etching residue of transfer lines adjacently disposed along the short-circuited bars 12 is significantly prevented, such that signals for light alignment can normally apply voltage on the array substrate and/or the substrate disposed on the opposite side of the array substrate through preset lines on the array substrate, thereby facilitating light alignment action and effectively avoiding the influence of potential short circuiting on the array substrate.

Figure 6:
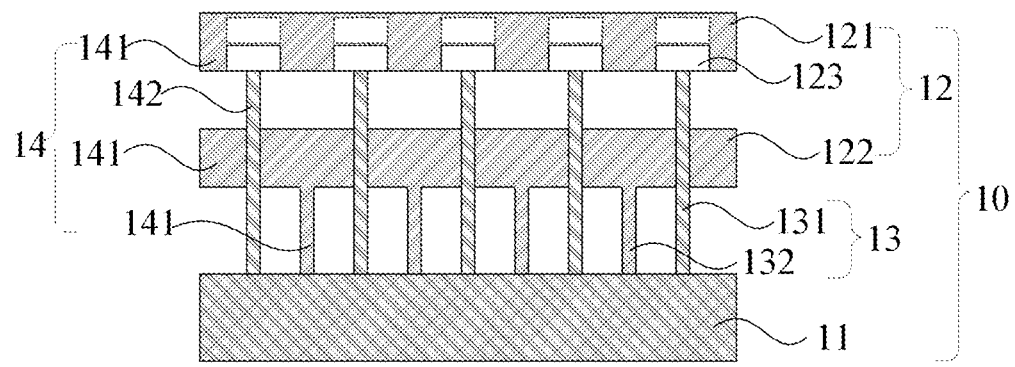
FIG. 6 is a schematic illustration of an alignment circuit according to a further embodiment of the present application.

As shown in FIG. 6, the first transfer lines 131 are disposed on the second metal 142 layer and the same manufacturing procedure is established together with the second metal layer 142; the first short-circuited bars 121, the second short-circuited bars 122 and the second transfer lines 132 are disposed on the first metal layer 141 and the same manufacturing procedure is established together with the first metal layer 141. The first metal layer 141 is used for wiring of the first short-circuited bars 121 and the second short-circuited bars 122, the first metal layer 141 is used for wiring of the first transfer lines 131, the second metal layer 142 is used for wiring of the second transfer lines 132. Different metal layers are used for wiring of the first transfer lines 131 and the second transfer lines 132 respectively, which facilitates preventing occurrence of etching residue, and thus short circuiting resulting from a form of etching residue of transfer lines adjacently disposed along the short-circuited bars 12 is significantly prevented, such that the alignment circuit 10 can better implement light alignment action to cause the liquid crystals to produce an incident angle to guarantee better display effect for the display panel.

Figure 7:
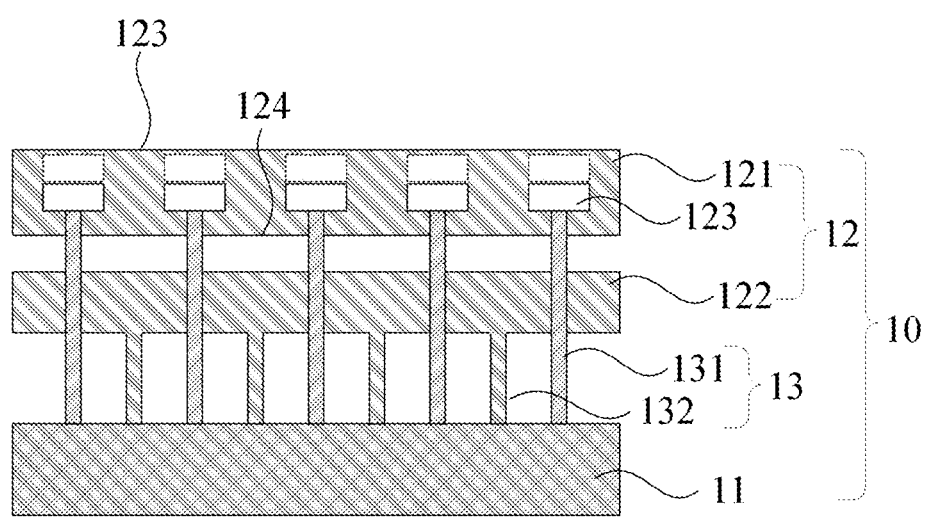
FIG. 7 is a schematic illustration of an alignment circuit according to a further embodiment of the present application.

As shown in FIG. 7, the first short-circuited bars 121 include first sides 123 and second sides 124 disposed in parallel with each other. The first short-circuited bars 121 have provided with the via holes 123 for connecting the first transfer lines 131 and the via holes 123 are equidistant from the first sides 123 and the second sides 124, such that the via holes 123 are in the middle position between the first sides 123 and the second sides 124. Because the short-circuited bars have high flatness in the middle position, short circuiting resulting from connection of transfer lines adjacently disposed can be more effectively improved, thereby further facilitating light alignment action. In addition, the via holes 123 are formed in more flat positions, such that the via holes 123 are more efficiently etched and formed, and thus the efficiency of forming the via holes 123 is improved and the shapes of the etched via holes 123 are more regular, the transfer lines can be connected to the short-circuited bar 12 through the via holes 123; meanwhile, in the position corresponding to the border of the short-circuited bar, although the border of the short-circuited bar 12 is out of flatness due to occurrence of etching residue, the spacing between adjacent transfer lines is relatively large at the border of the short-circuited bar 12 because the line width of the transfer line is smaller than the via hole 123, such that there is still less possibility that etching residue between adjacent transfer lines results in short circuiting.

The first short-circuited bars 121 and the second short-circuited bars 122 are disposed in parallel to each other, and the first transfer lines 131 and the second transfer lines 132 are disposed in parallel to each other. The first transfer lines 131 and the second transfer lines 132 are wired to the first bonding pads 11 in a straight line manner. Because the spacings between the first bonding pads 11 are limited and fixed, the spacings between the transfer lines 131 and the second transfer lines 132 are limited as well. By enabling more transfer lines to be disposed on the short-circuited bars 12 with limited length, better light alignment effect is guaranteed. By arranging the transfer lines in a spaced-apart manner, interference between the transfer lines can be effectively avoided. Because of parallel arrangement, the connection length of the transfer lines from the short-circuited bars 12 to the first bonding pads 11 enables the impedance of transfer lines to be significantly reduced and thus metal material consumption is further saved.

Figure 8:
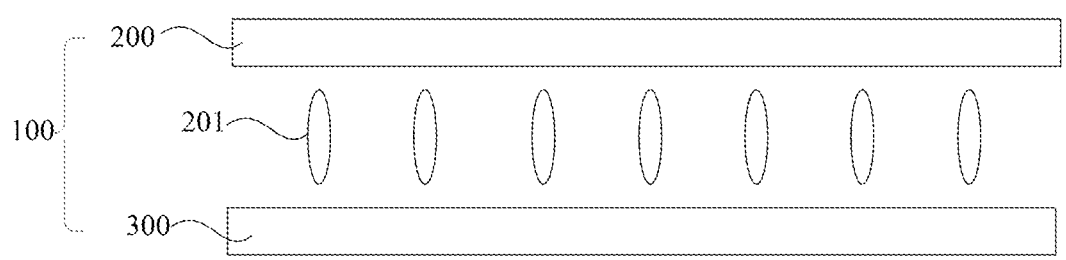
FIG. 8 is a schematic illustration of a display panel according to an embodiment of the present application.

As shown in FIG. 8, an embodiment of the present application provides a display panel 100, including the array substrate 300 as described above and an opposite substrate 200 disposed on the opposite side of the array substrate 300. A liquid crystal layer 201 is sandwiched between the array substrate 300 and the opposite substrate 200. The display panel 100 includes a color photoresist layer which may be disposed on the opposite substrate or the array substrate 300. In general, the alignment circuit is erased or cut when a display device is manufactured from the display panel; if the display panel 100 according to an embodiment of the present application is a liquid crystal display, the liquid crystal display includes a backlight unit which serves as a light source for providing sufficient brightness and evenly distributed light source. The backlight unit of this embodiment may be of front light type or back light type. It should be noted that the backlight unit of this embodiment is not limited thereto.

In an embodiment, the substrate material may be selected from, such as, glass and light-transmissive plastic.

In an embodiment, taking a liquid crystal panel as an example, the liquid crystal panel includes an array substrate and a color film (CF) substrate. The array substrate and the color film substrate are disposed oppositely to each other. Liquid crystals and a spacer structure are provided between the array substrate and the color film substrate. An active switch is disposed on the array substrate, which is, such as, a thin film transistor (TFT). A color photoresist layer is disposed on the color film substrate. The color photoresist layer and the active switch may be formed on the same substrate.

In an embodiment, an array substrate includes a liquid crystal panel, an organic light-emitting diode (OLED) panel, a quantum dot light emitting diodes (QLED) panel, a plasma panel, a flat panel, a curved panel, etc. and no limitation is made thereto.

The foregoing describes the present application in a further detail with reference to specific optional embodiments, and it should not be considered that specific implementation of the present application is limited to the descriptions. A person of ordinary skill in the art the present invention belongs, without departing from the concepts of the present application, can make various simple deductions or substitutions, which should be deemed to belong to the protective scope of the present application.

What is claimed is:

1. An array substrate, the array substrate comprises:
a display region and a peripheral region;
a plurality of pixels formed in the display region; and
a plurality of alignment circuits formed in the peripheral region for implementing alignment of liquid crystals within the pixels;
where the alignment circuits comprise first bonding pad and a plurality of short-circuited bars, each of the plurality of short-circuited bars is electrically connected to the first bonding pad through transfer lines, and any two of the transfer lines adjacently disposed are located on different metal layers.

2. The array substrate according to claim 1, wherein the short-circuited bars comprises first short-circuit bars and second short-circuited bars, the first short-circuited bars are electrically connected to the first bonding pad through a plurality of first transfer lines and the second short-circuited bars are electrically connected to the first bonding pad through a plurality of second transfer lines, and the first transfer lines and the second transfer lines are disposed on different metal layers.

3. The array substrate according to claim 2, wherein the metal layers comprise a first layer and a second layer; the array substrate comprises data lines; the data lines comprise a plurality of odd-numbered data lines and a plurality of even-numbered lines, and the odd-numbered data lines and the even-numbered data lines are disposed in a spaced-apart manner; the first transfer lines are coupled with the odd-numbered data lines and the second transfer lines are coupled with the even-numbered data lines, and the first transfer lines and the second transfer lines are disposed in a spaced-apart manner.

4. The array substrate according to claim 3, wherein
the first transfer lines and the first short-circuited bars are disposed on the first metal layer and a same manufacturing procedure is established together with the first metal layer; and
the second transfer lines and the second short-circuited bars are disposed on the second metal layer and a same manufacturing procedure is established together with the second metal layer.

5. The array substrate according to claim 3, wherein
the first transfer lines and the first short-circuited bars are disposed on the second metal layer and a manufacturing procedure is established together with the second metal layer; and
the second transfer lines and the second short-circuited bars are disposed on the first metal layer and a same manufacturing procedure is established together with the first metal layer.

6. The array substrate according to claim 2, wherein the first transfer lines are disposed on the first metal layer and a same manufacturing procedure is established together with the first metal layer; and the first short-circuited bars, the second short-circuited bars and the second transfer lines are disposed on the second metal layer and a same manufacturing procedure is established together with the second metal layer.

7. The array substrate according to claim 6, wherein different metal wiring is used for the first transfer lines and the second transfer lines.

8. The array substrate according to claim 7, wherein the second metal layer is used for wiring of the first transfer lines and the first metal layer is used for wiring of the second transfer lines.

9. The array substrate according to claim 6, wherein the first metal layer is used for wiring of the first short-circuited bars and the second short-circuited bars.

10. The array substrate according to claim 3, wherein the first transfer lines are disposed on the second metal layer and a same manufacturing procedure is established together with the second metal layer; and the first short-circuited bars, the second short-circuited bars and the second transfer lines are disposed on the first metal layer and a same manufacturing procedure is established together with the first metal layer.

11. The array substrate according to claim 10, wherein different metal wiring is used for the first transfer lines and the second transfer lines.

12. The array substrate according to claim 11, wherein the first metal layer is used for wiring of the first transfer lines and the second metal layer is used for wiring of the second transfer lines.

13. The array substrate according to claim 10, wherein the first metal layer is used for wiring of the first short-circuited bars and the second short-circuited bars.

14. The array substrate according to claim 6, wherein the first short-circuited bars comprise first side and second side disposed in parallel to each other; the array substrate comprise via holes, the via holes configured to connect the first transfer lines with the first short-circuited bars, and the via holes are equidistant from the first side and the second side.

15. The array substrate according to claim 1, wherein the array substrate material is light-transmissive glass.

16. The array substrate according to claim 1, wherein the array substrate comprises an active switch, and the active switch is a thin film transistor.

17. An array substrate, comprising:
a display region and a peripheral region;
a plurality of pixels formed in the display region; and
a plurality of alignment circuits formed in the peripheral region for implementing alignment of liquid crystals within the pixels;
where the alignment circuits comprise first bonding pad and a plurality of short-circuited bars, each of the plurality of short-circuited bars is electrically connected to the first bonding pad through transfer lines, and any two of the transfer lines adjacently disposed are disposed on different metal layers;
the short-circuited bars comprise first short-circuit bars and second short-circuited bars, the first short-circuited bars are electrically connected to the first bonding pad through a plurality of first transfer lines and the second short-circuited bars are electrically connected to the first bonding pad through a plurality of second transfer lines, and the first transfer lines and the second transfer lines are disposed on different metal layers;
the first transfer lines are disposed on the second metal layer and the same manufacturing procedure is established together with the second metal layer; and the first short-circuited bars, the second short-circuited bars and the second transfer lines are disposed on the first metal layer and the same manufacturing procedure is established together with the first metal layer;
the first short-circuited bars and the second short-circuited bars are disposed in parallel to each other and the first transfer lines and the second transfer lines are disposed in parallel to each other, and the first transfer lines and the second transfer lines are wired to the first bonding pad in a straight line manner; and the first short-circuited bars comprise first sides and second sides disposed in parallel to each other; the first short-circuited bars have provided with via holes for connecting the first transfer lines and the via holes are equidistant from the first sides and the second sides.

18. A display panel, comprising an array substrate, the array substrate comprises:

a display region and a peripheral region;

a plurality of pixels formed in the display region;

a plurality of alignment circuits formed in the peripheral region for implementing alignment of liquid crystals within the pixels;

where the alignment circuits comprise first bonding pad and a plurality of short-circuited bars, each of the plurality of short-circuited bars is electrically connected to the first bonding pad through transfer lines, and any two of the transfer lines adjacently disposed are disposed on different metal layers; and wherein the display panel further comprises an opposite substrate disposed on the opposite side of the array substrate; a liquid crystal layer is sandwiched between the array substrate and the opposite substrate.

* * * * *